United States Patent [19]

Türk et al.

[11] Patent Number: 5,851,502
[45] Date of Patent: Dec. 22, 1998

[54] PRECIPITATED SILICA

[75] Inventors: Günter Türk, Hanau; Gerold Schmidt, Rodenbach; Mustafa Siray, Bonn; Karl Meier, Alfter, all of Germany

[73] Assignee: Degussa Aktiengesellschaft, Frankfurt, Germany

[21] Appl. No.: 673,136

[22] Filed: Jul. 1, 1996

[30] Foreign Application Priority Data

Jul. 26, 1995 [DE] Germany ............ 195 27 278.1

[51] Int. Cl.$^6$ .................................. C01B 33/12
[52] U.S. Cl. .................... 423/335; 423/339; 501/133
[58] Field of Search .................... 423/335, 339; 501/133

[56] References Cited

U.S. PATENT DOCUMENTS

| | | |
|---|---|---|
| 3,351,495 | 11/1967 | Larsen et al. . |
| 3,445,189 | 5/1969 | Maat et al. . |
| 4,024,323 | 5/1977 | Versteegh et al. . |
| 4,237,083 | 12/1980 | Young et al. . |
| 4,874,594 | 10/1989 | Chevallier ............... 423/339 |
| 5,034,207 | 7/1991 | Kerner et al. ............ 423/339 |
| 5,110,574 | 5/1992 | Reinhardt et al. ....... 423/339 |
| 5,342,598 | 8/1994 | Perselb .................... 423/339 |
| 5,605,569 | 2/1997 | Boyer et al. ............. 423/339 |

FOREIGN PATENT DOCUMENTS

| | | |
|---|---|---|
| 1 496 123 | 3/1969 | Germany . |
| 3545615 C2 | 10/1986 | Germany . |
| 4427137A1 | 4/1995 | Germany . |
| 2 169 129 | 7/1986 | United Kingdom . |

*Primary Examiner*—Paul Marcantoni
*Attorney, Agent, or Firm*—Cushman Darby&Cushman IP Group of Pillsbury Madison & Sutro LLP

[57] ABSTRACT

Precipitated silica with the following physical-chemical characteristics:

| | | |
|---|---|---|
| BET surface: | DIN 66131 | 100–130 m$^2$/g |
| DBP absorption (anhydrous) | DIN 53601 ASTM D 2414 | ≧275 g/100 g |
| Loss on drying (2 h/105° C.) | DIN ISO 787/II ASTM D 280 | 3.5–5.5 wt. % JIS K 5101/21 |
| Oversize with ALPINE air-jet sieve: | | |
| >63 μm | | ≦10.0 wt. % |
| >150 μm | | ≦0.1 wt. % |
| >250 μm | | ≦0.01 wt. % |
| Chloride content: | | ≦100 ppm | is prepared by introducing water into a precipitation vessel, adding water glass until an alkali value of 5–15 is reached, then adding further water glass and sulfuric acid simultaneously, interrupting the precipitated silica suspension with sulfuric acid to a pH-value of 8.5, with stirring, then continuing acidification with concentrated sulfuric acid to a pH-value of 4, then separating and washing the precipitated silica which has a solids content in the suspension of approx. 88 g/l, liquefying the filter cake obtained, drying it with a spray drier and grinding it. The precipitated silica may be used for the production of battery separators.

11 Claims, No Drawings

PRECIPITATED SILICA

BACKGROUND OF THE INVENTION

1. Field of the Invention

The invention relates to a precipitated silica, the process for its preparation, and to its use for the production of battery separators.

2. Description of Related Art

It is known to use precipitated silicas for the production of microporous polyethylene battery separators (U.S. Pat. Nos. 3,351,495, 4,024,323, 4,681,750). The known silicas are precipitated silicas with a normal structure processed to battery separator films according to a conventional standard recipe by the compounding-extrusion process.

SUBSTITUTE OF THE INVENTION

The object and aim of the invention is the development of a highly structured silica with good structural stability and a low BET surface, a process for its preparation, and its use in the production of highly porous polyethylene-silica separators with a total porosity of $\geq 64\%$, with an ash content of $\geq 68$ wt. %, both with a residual oil content of 12–14%.

The invention provides a precipitated silica with the following physical-chemical data:

| BET surface: | DIN 66131 | 100–130 m$^2$/g |
|---|---|---|
| DBP absorption (anhydrous) | DIN 53601 ASTM D 2414 | $\geq 275$ g/100 g |
| Loss on drying (2h/105° C.): | DIN ISO 787/II ASTM D 280 JIS K 5101/21 | 3.5–5.5 wt. % |
| Oversize with ALPINE air-jet sieve: | | |
| >63 μm | | $\leq 10.0$ wt. % |
| >150 μm | | $\leq 0.1$ wt. % |
| >250 μm | | $\leq 0.01$ wt. % |

The invention also provides a process for the preparation of precipitated silica with the physical-chemical data:

| BET surface: | DIN 66131 | 100–130 m$^2$/g |
|---|---|---|
| DBP absorption (anhydrous) | DIN 53601 ASTM D 2414 | $\geq 275$ g/100 g |
| Loss on drying (2h/105° C.): | DIN ISO 787/II ASTM D 280 JIS K 5101/21 | 3.5–5.5 wt. % |
| Oversize with ALPINE air-jet sieve: | | |
| >63 μm | | $\leq 10.0$ wt. % |
| >150 μm | | $\leq 0.1$ wt. % |
| >250 μm | | $\leq 0.01$ wt. % | wherein hot water at a temperature of 90°–91° C. is introduced into a precipitation vessel, with stirring, commercial water glass with an SiO$_2$: Na$_2$O modulus of 3.34: 1 (SiO$_2$= 26.8 wt. %; Na$_2$O=8.0 wt. %) is added until a certain alkali value is reached (the alkali value is the consumption of 1N HCl in milliliters which is required for the neutralization of 100 ml of the starting solution with the use of phenolphthalein as indicator), whilst keeping the temperature constant throughout the precipitation period of 90 minutes further water glass with the same specification and sulfuric acid are then added simultaneously at two separate places in such a way that the prescribed alkali value is maintained; the precipitated silica suspension is then acidified with concentrated sulfuric acid to a pH-value of 8.5 within approx. 20 minutes, precipitation is interrupted for thirty minutes, with stirring and at 90°–91° C., the suspension is then further acidified to a pH-value of 4 with concentrated sulfuric acid, the precipitated silica having a solids content in the suspension of approx. 88 g/l is then separated by means of a chamber filter press, washed, the filter cake obtained is liquefied by means of water and mechanical shear forces spray-dried and ground with a roller mill, which is characterized in that a constant alkali value in the region of 5–15, preferably 7, is maintained during precipitation.

In one particular embodiment, spray drying of the silica is carried out with a solids content of the silica feed to be sprayed of 16–20 %, preferably 18%, a centrifugal atomizer speed of 10,000–12,000 rpm, and inlet temperatures of the hot gases of 700°–750° C. and outlet temperatures of 90°–120° C.

In another embodiment of the invention, a crossflow mill may be used for grinding instead of the roller mill.

In another embodiment of the invention, washing of the filter cake separated by means of a filter press may be carried out with low-chloride water (with $\leq 20$ ppm chloride), preferably with deionized water or condensate, until the chloride content in the ground end product is $\leq 100$ ppm chloride.

In another embodiment of the invention, a spin flash drier may be used instead of the spray drier. Optionally, it is possible to dispense with grinding the silica in this case.

The invention also provides the use of the precipitated silica according to the invention with the following physical-chemical data:

| BET surface: | DIN 66131 | 100–130 m$^2$/g |
|---|---|---|
| DBP absorption (anhydrous) | DIN 53601 ASTM D 2414 | $\geq 275$ g/100 g |
| Loss on drying (2h/105° C.): | DIN ISO 787/II ASTM D 280 JIS K 5101/21 | 3.5–5.5 wt. % |
| Oversize with ALPINE air-jet sieve: | | |
| >63 μm | | $\leq 10.0$ wt. % |
| >150 μm | | $\leq 0.1$ wt. % |
| >250 μm | | $\leq 0.01$ wt. % | in polyethylene-silica battery separators for industrial batteries on a lead-acid basis, which are characterized in that they have a total porosity of $\geq 64\%$, a resistivity after 24 hours of immersion in 37% battery acid of <0.60 m Ohm·inch$^2$/mil and an ash content of $\geq 68$ wt. % with a residual oil content of 12–14%.

The precipitated silica according to the invention may also be used in silica battery separators for starter batteries on a lead-acid basis with a silica-polyethylene ratio of 2.5:1–3.5:1, wherein the 8 to 10 mil separators may have a resistivity of $\leq 0.60$ m Ohm·inch$^2$/mil with a residual oil content of 12–14%.

The microporous separating elements for batteries are produced by intensive mixing of a high molecular weight polyethylene with the precipitated silica (prepared according to the invention), process liquid and stabilizers to form a powder mixture which is extruded to obtain a film having a thickness of 0.2 to 0.7 mm which is subjected to an extraction treatment to remove the process liquid.

The highly porous battery separator films are produced from the silicas of the invention using known methods, e.g., those set forth in U.S. Pat. Nos. 3,351,495, and 4,237,083 or DE-AS 1,496,123.

The following procedure is preferred:
A composition comprising:
5.4–7.7 wt. % of high molecular weight polyethylene
0.1–0.2 wt. % of carbon black masterbatch
0.1–0.3 wt. % of stabilizer
26.1–27.8 wt. % of precipitated silica
66.2–67.9 wt. % of mineral oil is converted to a mixture in powder form by intensive mixing of the individual components in a high speed mixer. The mixture is then processed in a twin-screw extruder at temperatures between 190° and 200° C. Forming of the separator film takes place using a flat-sheet die and a downstream calendar. The resulting film thickness is 0.2 to 0.7 mm.

The process of extrusion and calendaring is followed by extraction. To this end, the mineral oil is removed to a large extent by extraction with n-hexane. The n-hexane absorbed is then removed by drying at room temperature. An important aspect when assessing a silica is its behavior during processing (torque values and melt pressures).

Moreover, the absorbency of the silica and flow properties of the mixture are assessed during its preparation. The torque on the extruder shaft and the melt pressure in front of the die are assessed during metering and extrusion of the mixture.

The torque measurement is based on the power consumption of the drive motor and is given as a percentage of the maximum permissible power consumption. The melt pressure in bar is measured with a pressure cell. The pressure cell has a sensor which is immersed in the melt in front of the barrel wall. This measuring point is situated between the end of the screw and the beginning of the die.

The separator films were tested in the following manner:
Examples of Test Methods
The following test methods are used:
Extraction of oil from the extruded film (blacksheet)
Residual oil content 12–14%.
A)
The oil is transferred to a solvent by extraction of battery separator films (blacksheet). This oil-reduced film is then known as greysheet and corresponds to the end product of the separator production process.
B) Aim of the test:
1. To obtain as constant as possible a residual oil content of 12–14% in the film (greysheet).
2. Production of a film for further applications-related tests.
3. To determine the shrinkage due to extraction.
C) Preparation of samples:
1.1 A certain number of samples (min. 10) are cut off from the battery separator film roll (blacksheet) (scissors or knife).
1.2 The film sections are cut to a particular size with paper crocodile shears.
1.3 Dimensions: MD=180 mm MD=Moving direction of machine
CMD=150 mm
CMD=Crosswise to the moving direction of machine
D) Procedure:
The oil is extracted from the film with n-hexane in 3 stages.
1.1 Weigh all the samples (blacksheet)
Accuracy: ±0.01 gr
1.2 Lay the samples individually in the solvent bath.
1.3 Residence time in the solvent bath:
a) 5–10 mil* films: 2 minutes each per solvent bath
b) 22 mil* films: 5 minutes each per solvent bath * 1 mil=0.0254 mm
1.4 Drying time
Leave films to dry for 15 minutes in the fume cupboard with continuous aeration.
1.5 Weigh all the samples (greysheet).
Accuracy: ±0.01 gr
Determination of the resistivity of extruded films (greysheet)
A)
A film sample is tested for resistivity in an acid bath.
B) Aim of the test:
A defined measure of the resistivity of the separator film shall be determined as the sheet resistance based on the film thickness.
Unit: $mOhm \times inch^2/mil$.
C) Apparatus:
1.1 Battery Tester Model 9100-2 Low Resistance Test System
Manufacturer: Palico Instrument Laboratories USA
1.2 Water bath/temperature-controlled.
D) Preparation of samples:
A certain number of samples (min. 3) undergo the test in sequence.
E) Procedure:
1.1 The film thicknesses of the prepared samples are determined.
Accuracy: ±0.01 mm.
1.2 The samples are stored in battery acid.
1.3 After 20 minutes of storage in battery acid, the samples are introduced individually into the appropriate device of the battery tester.
1.4 The measuring procedure is started in accordance with the operating instructions of the battery tester and the relevant measurement data are recorded.
1.5 An arithmetic mean is formed from the values determined.
1.6 The measured samples are stored again in battery acid.
1.7 After 24 hours' storage in battery acid, the samples are introduced individually into the appropriate device of the battery tester.
1.8 The measuring procedure is started in accordance with the operating instructions of the battery tester and the relevant measurement data are recorded.
1.9 An arithmetic mean is formed from the values determined.
F) Evaluation of the measurements
1.1 "Resistivity"
Determination of the mechanical properties of extruded films (greysheet) in terms of tensile strength and elongation at break
A)
A film sample is extended until it ruptures, the rate of extension being kept constant. The elongation and the force applied are measured.
B) Aim of test:
A defined measure of the tensile strength and elongation at break of the separator film shall be determined.
C) Apparatus:
1.1 Universal test machine, TZM 771 type, 20 kN Manufacturer: Otto Wolpert Werke GmbH
1.2 Accessories: Pneumatic clamping grip for thin films.
Manufacturer: Otto Wolpert Werke GmbH
1.3 Accessories: Load cell 500 N.
Manufacturer: Otto Wolpert Werke GmbH
1.4 Film roll cutting machine D) Preparation of samples A certain number of samples (min. 2) undergo the test in sequence.

E) Procedure 1.1 4 strips are cut out of each sample (crosswise to the direction of extrusion CMD) to a size of 100 (CMD)×25 (MD) mm.

1.2 The film thickness of the strips is determined. Accuracy: ±0.01 mm.

1.3 The universal test machine is set up in accordance with the operating instructions.

1.4 The individual test strip is clamped into the pneumatic clamping grips of the universal test machine so that there is a gap of 50 mm between the clamping grips. The clamping depth of the strips is 25 mm per grip.

1.5 The load cell is adjusted to zero in accordance with the operating instructions. Range of measurement: 0–50N.

1.6 The speed applied is 500 mm/min.

1.7 The measuring procedure is started.

1.8 An arithmetic mean is formed from the values determined.

F) Evaluation of the measurements 1.1 "Tensile strength"

Load in N/surface area in mm$^2$ (Test strip width×test strip thickness)=tensile strength in N/mm$^2$ 1.2 "Elongation at break"

Total length of the sample after rupture based on the initial length between the clamping devices multiplied by 100% gives the elongation at break.

Extraction of oil from the extruded film (blacksheet)

Residual oil content <0.5% /"zero extraction"

A)

The oil is transferred to a solvent by extraction of battery separator films (blacksheet). This approximately oil-free film then undergoes further tests.

B) Aim of method:

1. To obtain as constant as possible a residual oil content of 12–14% in the film (greysheet).

2. Production of films for further applications-related tests.

3. To determine the shrinkage due to extraction.

C) Preparation of samples:

1.1 A certain number of samples (min. 10) are cut off from the battery separator film roll (blacksheet) (scissors or knife).

1.2 The film sections are cut to a particular size with paper crocodile shears.

1.3 Dimensions: MD=180 mm MD=Moving direction of machine

CMD=150 mm CMD=Crosswise to the moving direction of machine

D) Procedure:

The oil is extracted from the film in 3 stages (3×10 1 refined steel containers), n-hexane being used as the extraction agent.

1.1 Weigh all the samples (blacksheet). Accuracy: ±0.01 gr 1.2 Lay the samples individually in the solvent bath.

1.3 Residence time in the solvent bath:

a) 5–10 mil* films: 2 minutes each per solvent bath b) 22 mil* films: 5 minutes each per solvent bath

* 1 mil=0.0254 mm 1.4 Extract the samples once again as described under 1.3 in the 4th stage, but with pure, oil-free n-hexane, i.e. the solvent should be free from oil residues.

1.5 Drying time

Leave films to dry for 15 minutes in the fume cupboard with continuous aeration.

1.6 Weigh all the samples (greysheet).

Accuracy: +0.01 gr

Pore volume

A. Aim of test

The open pore volume is determined in relation to the total volume.

B.

The pore volume is significant for the electrical behavior in the battery and the volume of the electrolyte displaced.

C. Apparatus 1.1 Scales with wire and hook 1.2 1 liter beaker 1.3 Vacuum desiccator 1.4 Vacuum pump 1.5 Paper knife 1.6 Aerosol OT (Cyanamid)

Aqueous solution with a concentration of 0.1%

D. Samples 1.1 Cut 3 separator samples to a size of 3.0"×4.0" (76 mm×102 mm).

1.2 Weigh each sample to an accuracy of 0.01 g (dry weight).

E. Procedure 1.1 Lay the samples in the 1 liter beaker and cover them completely with 0.1% Aerosol OT.

1.2 Lay the samples in the vacuum desiccator and evacuate with the vacuum pump.

1.3 After 4 hours, hang the samples on the scales and determine the weight of the samples immersed in water (weight when immersed).

1.4 Dry the samples by wiping them with a cloth.

1.5 Weigh the samples in the air (weight when wet).

F. Calculation

Pore volume=

(weight when wet - dry weight)×100 weight when wet - weight when immersed

Determination of the ash content of silica-containing polyethylene battery separators A. Apparatus required 1.1 Analytical balance, weighing accuracy 0.1 mg 1.2 Desiccator 1.3 Muffle furnace: 950°±10° C.

1.4 Crucible: either porcelain crucible, Al type with cover, which should have a hole with a diameter of 2 mm; or a quartz crucible with cover, QGT type, Bad Harzburg, Dr. Rademacher type, dimensions: diameter 27 mm, height 47 mm B. Procedure 1.1 Determination of the volatile constituents Approx. 1 g of a plastic preparation dried beforehand for 1 h at 105° C. is weighed to an accuracy of ±0.0001 g into the quartz crucible provided with a cover (E); the covered crucible is placed in a muffle furnace for 7.0 min at a controlled temperature of 950°±10° C. in order to distil off the volatile constituents. After cooling in the desiccator, the crucible with lid is weighed again (A).

1.2 Determination of the ash content

The open crucible and the cover are then calcined again under air until the weight is constant (1–1.5 h at 950° C.). After cooling in the desiccator, the crucible with cover is weighed again ($A_1$).

1.3 Calculation 1.3.1 Volatile constituents: (1- A)×100 [%] E 1.3.2 Ash content: A×100 [%]

1.3.3 Silica content: $A - A_2 \times 100$ [%]
E=Initial weight of concentrate after predrying [g]
A=Weight after determination of the volatile constituents (2.1) [g]
$A_1$=Weight after determination of the ash (2.2) [g]

DESCRIPTION OF THE PREFERRED EMBODIMENTS

EXAMPLE 1
(Comparison example)

The commercial product HiSil® SBG from the US company Pittsburgh Plate Glass Company, Pittsburgh, USA, is produced according to the disclosure of U.S. Pat. No. 4,681,750. The physical-chemical data are given in Table 1.

EXAMPLE 2
(according to the invention)

A starting mixture is prepared in a 75 m³ wooden tank, for which purpose 1,698 kg of sodium silicate solution (8.90 wt. % of $Na_2O$; 27.73 wt. % of $SiO_2$ with a $SiO_2$: $Na_2O$ modulus=3.22) and 56.6 m³ of hot water are mixed and the temperature adjusted to 90° C. The alkali value of the starting mixture (consumption of 1N HCl per 100 ml of starting solution against phenolphthalein) is 7.0.

During the next 90 minutes, whilst keeping a constant alkali value of 7 and a temperature of 90°–91° C., 21,140 kg of sodium silicate solution (57° C., 8.90 wt. % of $Na_2O$ and 27.73 wt. % of $SiO_2$ with an $SiO_2$: $Na_2O$ modulus of 3.22) and 2,851 kg of 94% sulfuric acid are allowed to flow into the starting mixture, with stirring.

The addition of sodium silicate solution is then stopped and the addition of 94% sulfuric acid is continued in such a way that the pH-value of the precipitation suspension after approx. 25 minutes is 8.5.

There then follows a 30 minute interruption phase at pH 8.5, during which neither acid nor water glass solution flow into the precipitation suspension.

Finally, the addition of 94% sulfuric acid is continued in such a way that the pH-value of the precipitation suspension after approx. 10 minutes is approx. 4.0 The solids content of the suspension is 88 g $SiO_2$/liter.

Said precipitated silica suspension is diluted with 45,920 liters of water, then introduced into a chamber filter press in order to separate the silica and then washed with low-chloride water.

After the wash process, the filter cake with a solids content of approx. 20 wt. % is liquefied by means of mechanical shear forces with the addition of concentrated sulfuric acid. Sulfuric acid is added until the pH-value of the silica suspension is approx. 3.7 to 4.0.

Said silica suspension is then passed to a spray drier which is fitted with a rapidly rotating atomizer disc for the purpose of atomization. Approx. 9.0 m³ of the suspension are atomized and spray dried per hour. The speed of the disc is 10,000 rpm. Approx. 1.8 t (9 m³.20 wt. %=1.8 t $SiO_2$) of silica per hour are obtained. The spray drier is heated with natural gas. The inlet temperature of the hot gases is 700° to 750 C., the temperature of the effluent gases is 113° to 118° C.

The average residence time of a silica particle in the hot gas stream is approx. 9 to 10 seconds. The spray-dried precipitated silica is separated from the hot gas stream by a filter. It is ground with a roller mill. The physical-chemical data of the silica obtained are given in Table 1.

EXAMPLE 3
(according to the invention)

The silica is prepared according to Example 2. Only grinding is carried out in a cross-flow mill UP 1000 from ALPINE, Augsburg. The physical-chemical data of the silica obtained are given in Table 1.

EXAMPLE 4
(according to the invention)

The silica is prepared according to example 2 as far as the stage of washing the chamber filter cake. This is followed by spin flash drying. The physical-chemical data are given in Table 1.

The parameters are determined with the following methods of measurement:

1) BET surface: DIN 66 131
2) DBP absorption: DIN 53 601 / ASTM D 2414
3) Loss on drying: DIN ISO 787/II, ASTM D 280, JIS K 5101/21
4) Oversize with
   ALPINE air-jet sieve: DEGUSSA in-house method, as described below
5) Chloride content: By chemical analysis Determination of the oversize with the ALPINE air-jet sieve In order to determine the oversize, the precipitated silica is screened through a 500 μm sieve to remove any deaeration lumps. 10 g of the screened material are then placed on a particular air-jet sieve and screened at a reduced pressure of 200 mm water column.

TABLE 1

Physical-chemical data of precipitated silicas (Examples nos. 1–4)

| Example no. | 1 | 2 | 3 | 4 |
|---|---|---|---|---|
| Precipitated silica: Name/choice of parameter | Commercial product HiSil SBG | Silica according to the invention | Silica according to the invention | Silica according to the invention |
| BET surface (m²/g) | 155 | 121 | 116 | 128 |
| DBP absorption (g/100 g) (anhydrous) | 226 | 285 | 278 | 275 |
| Loss on drying (wt. %) (2 h/105° C.) | 5.6 | 4.6 | 5.5 | 4.2 |
| Oversize with ALPINE air-jet sieve (wt. %) | | | | |
| >63 μm | 0.23 | 1.0 | <0.4 | 8.4 |
| >150 μm | <0.01 | 0.01 | not det. | not det. |
| >250 μm | <0.01 | <0.01 | not det. | 0.02 |
| Chloride content (ppm) | 176 | 68 | 158 | 270 |

Precipitated silica particles that settle on the acrylic glass cover of the sieve device are knocked off by a few taps on the knob of the sieve lid. Screening ends when the oversize remains constant, a situation which can usually be recognized from the free-flowing appearance. For safety's sake, screening is then continued for another minute. The screening process generally takes five minutes. In the case of materials that contain only particle size fractions of <500 μm, the sample is not screened beforehand, but placed directly on the air-jet sieve.

In the event of any agglomerates forming, the screening process is briefly interrupted and the agglomerates broken up with a brush under gentle pressure. After screening, the oversize is carefully tapped off the air-jet sieve and reweighed.

Calculation: The oversize is given in weight percent in conjunction with the mesh size of the sieve.

Apparatus: ALPINE air-jet sieve, laboratory type S 200, with screen fabric according to DIN 4188.

Determination of the chloride content in precipitated silicas Procedure:

On the basis of silica samples containing approx. 100 ppm chloride, 1–3 g are weighed out accurately and stirred with 25 ml of distilled water and 25 ml of a 5N sodium hydroxide solution in a 150 ml glass beaker. The suspension is heated over a hotplate until a clear solution is obtained. The solution is cooled in a water bath and 25 ml of 50% nitric acid are added. The nitric acid is added in one operation, with stirring. After renewed cooling of the solution, a little acetone is added. Titration is then carried out with 0.05N silver nitrate solution.

For each series of determinations, a blank titration is carried out, the blank value being deducted from the value of the sample determination. To this end, it is necessary to use the same reagents as those used for the chloride determination of the individual samples.

The first derivation of the titration curve is plotted. The end point of the titration is reached when the curve passes through a pronounced maximum. According to the differential curve, a 1 cm section corresponds to the consumption of 0.1 ml of the 0.05N silver nitrate solution.

Calculation:
1 cm corresponds to 0.1 ml of $AgNO_3$ solution
V=consumption in ml (zone A - blank value)
E=initial weight of sample in grams
N=normality of the silver nitrate solution
F=factor for silver nitrate solution $$\text{ppm Cl}^- = \frac{V \times 35.5 \times N \times 100 \times F \times 10{,}000}{1000 \cdot E}$$

Solutions, reagents and apparatus:
Silver nitrate solution: 0.05N
Nitric acid: 50%
NaOH solution: 5N
Acetone
Hydrochloric acid solution: 0.01N (for standardization of the silver nitrate solution)
Titrator TTT 60: (Manufacturer: Radiometer)
Digital pH meter PHM 63: (Manufacturer: Radiometer)
Automatic burette ABU 12: (Manufacturer: Radiometer) with 2.5 ml burette
Recorder REC 61: (Manufacturer: Radiometer)
Selective chloride electrode: (Manufacturer: Radiometer)
Reference electrode: (Manufacturer: Radiometer)
Magnetic stirrer In Examples 5–19, the precipitated silicas obtained according to examples 1–4 are tested in separator films.

EXAMPLE 5

750 g of silica according to Example 1 are mixed in a fluid mixer (FM 10 C type from Thyssen Henschel, Kassel, FRG) with 222 g of Hostalen GUR 4150 (ultra-high molecular weight type of high density polyethylene from HOECHST® AG, Frankfurt a.M.) with 2.4 g of Topanol C antioxidant (ICI, England, butylated hydroxytoluene) and with 4.8 g of COLCOLOR E50/G carbon black masterbatch (Degussa AG., Frankfurt/Main containing 50% PRINTEX® G carbon black pigment in low density polyethylene) at a speed of 700 rpm and then sprayed with a quantity of 1655 g of Gravex mineral oil 942 (Shell) with the aid of a gear pump and a single-component nozzle. The product thereby obtained is a free-flowing, and continuously meterable powder which is processed with the aid of a twin-screw extruder (ZSK 30 M 9/2 type from Werner & Pfleiderer, Stuttgart) with a heated flat-sheet die 220 mm wide (Gottfert Prufmaschinen GmbH, Buchen) and a triple roll calender (Polyfol 150 3 S type from Ruth Schwabenthan, Berlin) to obtain a film about 0.550–0.600 mm thick. At a screw speed of 105 rpm, a temperature profile of 150° to 200° C. is chosen between the feed zone of the extruder and the die. The melt temperature measured between the extruder and the die is 196° C. The melt pressure in bar and the torque of the screws as a % of the maximum permissible torque are read off the twin-screw extruder as a measure of the processing behavior of the mixture during extrusion. The mineral oil is then extracted to a large extent from the film thus produced with hexane so that a microporous separator film is obtained.

The resistivity, the mechanical properties such as tensile strength, elongation at break, total porosity and ash content of the films extracted to a residual oil content of 12–14% are measured in accordance with the methods described above. The measured values determined from the films produced according to Example 5 are summarized in Table 2. These values form the reference values for Examples 6–8, in which silica according to the invention according to Example 2 is used.

EXAMPLE 6

Procedure according to Example 5, wherein the precipitated silica is replaced by the silica according to the invention according to Example 2. The film data may be found in Table 2.

EXAMPLE 7

In this Example, the procedure according to Example 6 is adopted, a quantity of 1700 g of process oil being used instead of 1655 g. The film data may be found in Table 2.

EXAMPLE 8

In this Example, the procedure according to Example 6 is adopted. The only exception is the use of a quantity of 1900 g of process oil instead of 1655 g. The film data may be found in Table 2.

EXAMPLE 9

Separator mixtures with a silica : polymer ratio of 4:1 are produced, extruded and characterized. The procedure adopted is that of Example 5, but only 188 g of the polymer used in Example 5 are used (instead of 222 g). Moreover, unlike Example 5, a quantity of 1700 g of oil is used instead of 1655 g. The film data determined may be found in Table 3. These values form the reference values for Examples 10–12, in which silica according to the invention according to Example 2 is used.

TABLE 2

Production conditions and properties of highly porous separator films containing commercial precipitated silica and spray-dried precipitated silicas according to the invention. Silica:polymer ratio = 3.4:1

| Example no. | | 5 | 6 | 7 | 8 |
|---|---|---|---|---|---|
| Precipitated silica | | Commercial product HiSil SBG | Silica acc. to the invention (Ex. 2) | Silica acc. to the invention (Ex. 2) | Silica acc. to the invention (Ex. 2) |
| Oil quantity | grams | 1655 | 1655 | 1700 | 1900 |
| Melt temperature | °C. | 196 | 198 | 195 | 193 |
| Melt pressure | bar | 133 | 148 | 136 | 96 |
| Torque | % | 53 | 51 | 50 | 44 |
| Resistivity | mΩ | 1.46 | 1.27 | 1.43 | 1.23 |
| after 20 min. soak | in$^2$/mil | 1.06 | 0.87 | 0.94 | 0.81 |
| after 24 hours' soak | | | | | |
| Total porosity | vol % | 55.1 | 58.7 | 58.8 | 58.4 |
| Ash content | wt. % | 68.1 | 68.2 | 68.0 | 67.9 |
| Mechanical properties: | | | | | |
| Elongation | % | 749 | 592 | 782 | 815 |
| Tensile strength | N/mm$^2$ | 4.15 | 4.79 | 4.47 | 4.47 |

TABLE 3

Production conditions and properties of highly porous separator films containing commercial precipitated silica and spray-dried precipitated silicas according to the invention. Silica:polymer ratio = 4:1

| Example no. | | 9 | 10 | 11 | 12 |
|---|---|---|---|---|---|
| Precipitated silica | | Commercial product HiSil SBG | Silica acc. to the invention (Ex. 2) | Silica acc. to the invention (Ex. 2) | Silica acc. to the invention (Ex. 2) |
| Oil quantity | grams | 1700 | 1700 | 1900 | 2100 |
| Melt temperature | °C. | 194 | 197 | 192 | 193 |
| Melt pressure | bar | 102 | 116 | 82 | 61 |
| Torque | % | 47 | 44 | 40 | 35 |
| Resistivity | mΩ | 1.27 | 0.92 | 0.90 | 0.83 |
| after 20 min. soak | in$^2$/mil | 0.85 | 0.64 | 0.60 | 0.57 |
| after 24 hours' soak | | | | | |
| Total porosity | vol % | 60.3 | 63.9 | 64.3 | 64.8 |
| Ash content | wt. % | 70.4 | 70.1 | 70.2 | 70.1 |
| Mechanical properties: | | | | | |
| Elongation | % | 722 | 759 | 750 | 702 |
| Tensile strength | N/mm$^2$ | 3.43 | 3.65 | 2.90 | 2.50 |

TABLE 4

Production conditions and properties of highly porous separator films containing commercial precipitated silica and spray-dried precipitated silicas according to the invention. Silica:polymer ratio = 5:1

| Example no. | | 13 | 14 | 15 | 16 |
|---|---|---|---|---|---|
| Precipitated silica | | Commercial product HiSil SBG | Silica acc. to the invention (Ex. 2) | Silica acc. to the invention (Ex. 2) | Silica acc. to the invention (Ex. 2) |
| Oil quantity | grams | 1700 | 1700 | 1900 | 2000 |
| Melt temperature | °C. | 192 | 195 | 191 | 190 |
| Melt pressure | bar | 76 | 100 | 70 | 60 |
| Torque | % | 48 | 44 | 37 | 34 |
| Resistivity | mΩ | 0.86 | 0.68 | 0.73 | 0.60 |
| after 20 min. soak | in$^2$/mil | 0.68 | 0.49 | 0.42 | 0.51 |
| after 24 hours' soak | | | | | |
| Total porosity | vol % | 63.1 | 68.7 | 70.1 | 70.4 |
| Ash content | wt. % | 73.4 | 73.1 | 73.5 | 73.0 |
| Mechanical properties: | | | | | |
| Elongation | % | 558 | 591 | 608 | 596 |
| Tensile strength | N/mm$^2$ | 2.20 | 2.44 | 2.18 | 2.24 |

EXAMPLE 10

The separator film is produced in accordance with Example 9. The silica HiSil SBG used in Example 9 is replaced by the silica according to the invention according to Example 2. The film data are contained in Table 3.

EXAMPLE 11

The procedure according to Example 10 is adopted. The only exception is the use of a quantity of 1900 g of process oil instead of 1700 g. The film data are given in Table 3.

EXAMPLE 12

The procedure according to Example 10 is adopted. The only exception is the use of a further increased quantity of 2100 g of process oil instead of 1700 g oil. The film data are given in Table 3.

EXAMPLE 13

Separator mixtures with a silica:polymer ratio of 5:1 are produced, then extruded, extracted and characterized.

The procedure according to Example 5 is adopted, but only 150 g of the polymer used therein is used (instead of 222 g). Moreover, an oil quantity of 1700 g instead of 1655 g is used. The film data determined may be found in Table 4. These values form the reference data and comparison data for Examples 14–16 in which silica according to the invention according to Example 2 is used.

EXAMPLE 14

The separator film is produced in accordance with Example 13. The commercial silica HiSil® SBG used in Example 13 is replaced by the silica according to the invention according to Example 2. The film data determined are summarized in Table 4.

EXAMPLE 15

The procedure according to Example 14 is adopted. The only exception is the use of a quantity of 1900 g of process oil instead of 1700 g. The film data are listed in Table 4.

EXAMPLE 16

The procedure according to Example 14 is adopted. The only exception is the use of a quantity of 2000 g of process oil instead of 1700 g. The film data are given in Table 4.

The results according to Tables 2–4 show:

in the case of the extrusion data, the melt temperature falls by 4°–5° C. as the oil quantity increases in the case of all the $SiO_2$:PE ratios examined and comparable separator mixtures (same silica); this also applies to the melt pressure and the particularly important torque value.

The fall of 40–55 bar for the melt pressure is particularly pronounced; the fall in torque is in the region of 15–25%. These results show that an increase in performance during extrusion may be achieved.

Surprisingly, the melt pressure falls as the silica:polymer ratio rises in the case of comparable separator mixtures; the same applies to the torque.

The commercial product HiSil® SBG exhibits this phenomenon only for the melt pressure development, not for the torque.

In the direct comparison of the same separator mixtures containing on the one hand HiSil® SBG and on the other hand silica according to the invention according to Example 2, the melt pressures for HiSil® SBG-containing mixtures are 10–24% below the level of separator mixtures containing silica according to the invention; the situation is reversed for the torque: in this case, the values for the separator mixtures containing silica according to the invention are 4–9% lower than those of the commercial product.

As regards the film data, the separator films with the silica according to the invention according to Example 2 under the same conditions of production exhibit a markedly reduced resistivity of 18–20% depending on the mixing ratio of $SiO_2$:PE. The resistivity falls as the $SiO_2$:PE ratio increases, referred to mixtures containing HiSil® SBG.

With all the $SiO_2$:PE ratios and comparable separator mixtures examined (silicas according to the invention), the total porosity increases with increasing oil quantity by a maximum of 1.7 absolute percentage points (with an $SiO_2$:PE ratio of 5:1). If the $SiO_2$:PE ratio is equal to 4:1, this increase is only approx. 1% in absolute terms, whilst there is no change if the $SiO_2$: PE ratio is equal to 3.4:1. When the $SiO_2$: PE ratio changes from 3.4:1 to $SiO_2$:PE=5:1, an increase in porosity of 12 absolute percentage points (+20%) is achieved for the silica according to the invention according to Example 2; in the case of $SiO_2$:PE ratios of 4:1 and 5:1, total porosity values of 65 and 70% respectively are achieved, which exceeds the level of values for the silica-containing separator with the highest porosity on the market hitherto, namely the PVC-silica separating element made by Amersil (Example 17). The values of the separator are just achieved if HiSil SBG-containing PE films are produced with an $SiO_2$: PE ratio of 5:1.

EXAMPLE 17

A commercial PVC-silica separator from AMERSIL in Kehlen, Luxembourg was characterized in terms of its film data. The result of these investigations may be found in Table 5, last column. The data do not, therefore, fall within the range of the invention of this claims.

TABLE 5

Highly porous PE-$SiO_2$ industrial battery separators containing the precipitated silicas according to the invention in an $SiO_2$:PE ratio of 3.4:1–5:1. Comparison with commercial silica and comparison with commercial PVC-$SiO_2$ separator.

| Separator | Example 5 Comparison | Example 8 Comparison | Example 9 Comparison | Example 12 according to the invention | Example 13 Comparison | Example 15 according to the invention | Example 17 AMERSIL separator comparison | Separator acc. to claim 9 |
|---|---|---|---|---|---|---|---|---|
| Type of silica:$SiO_2$:PE ratio | HiSil SBG 3.4:1 | Silica acc. to inv. acc. to Ex. 2 3.4:1 | HiSil SBG 4:1 | Silica acc. to inv. acc. to Ex. 2 4:1 | HiSil SBG 5:1 | Silica acc. to inv. acc. to Ex. 2 5:1 | Unknown 1.1:1 | Precip. silica ≧4:1 |
| Total porosity (%) | 55.1 | 58.4 | 60.3 | <u>64.8</u> | 63.1 | <u>70.1</u> | 63.2 | ≧64 |

TABLE 5-continued

Highly porous PE-SiO$_2$ industrial battery separators containing the precipitated silicas according to the invention in an SiO$_2$:PE ratio of 3.4:1–5:1. Comparison with commercial silica and comparison with commercial PVC-SiO$_2$ separator.

| Separator | Example 5 Comparison | Example 8 Comparison | Example 9 Comparison | Example 12 according to the invention | Example 13 Comparison | Example 15 according to the invention | Example 17 AMERSIL separator comparison | Separator acc. to claim 9 |
|---|---|---|---|---|---|---|---|---|
| Ash content (%) | 68.1 | 67.9 | 70.4 | 70.1 | 73.1 | 73.5 | 51.5 | ≧68 |
| Resistivity after 24 h soak (mΩ in.$^2$/mil) | 1.06 | 0.81 | 0.85 | 0.57 | 0.68 | 0.42 | 0.73 | ≦0.60 |

TABLE 6

Production conditions and properties of highly porous separator films containing commercial precipitated silica and spray-dried precipitated silicas according to the invention. Silica:polymer ratio = 4:1

| Example no. | | 9 | 18 | 19 | 17 |
|---|---|---|---|---|---|
| Precipitated silica | | Commercial product HiSil SBG | Silica acc. to the invention (Ex. 3) | Silica acc. to the invention (Ex. 4) | Unknown AMERSIL (comparison) |
| Oil quantity | grams | 1700 | 1900 | 1900 | — |
| Melt temperature | °C. | 194 | 196 | 190 | — |
| Melt pressure | bar | 102 | 98 | 71 | — |
| Torque | % | 47 | 47 | 38 | — |
| Resistivity | m A · | 1.27 | 0.78 | 1.05 | 0.93 |
| after 20 min. soak | in$^2$/mil | 0.85 | 0.45 | 0.58 | 0.73 |
| after 24 hours' soak | | | | | |
| Total porosity | vol % | 60.3 | 64.9 | 65.0 | 63.2 |
| Ash content | wt. % | 70.4 | 70.8 | 70.3 | 51.5 |
| Mechanical properties: | | | | | |
| Elongation | % | 722 | 785 | 713 | — |
| Tensile strength | N/mm$^2$ | 3.43 | 3.36 | 2.82 | — |

EXAMPLE 18

In this Example, the commercial silica HiSil® SBG of Example 5 is replaced by the silica according to the invention according to Example 3. Moreover, the oil proportion in the recipe of Example 5 is increased from 1655 g to 1900 g oil. The film data may be found in Table 6.

EXAMPLE 19

In this Example, the commercial silica HiSil® SBG of Example 5 is replaced by the silica according to the invention according to Example 4. Moreover, the oil proportion in the recipe of Example 5 is increased from 1655 g to 1900 g oil. The film data may be found in Table 6.

The highly structured precipitated silicas according to the invention (DBP value, anhydrous: ≧275 g/100 g and BET surface of 100–130 m$^2$/g) are also highly suitable for the production of silica-polyethylene separators for car starter batteries with an SiO$_2$:PE ratio of 2.5:1 to 3.5:1 and a separator thickness of 0.20–0.25 mm. Surprisingly, there is a marked decrease in the resistivity to values below 0.60 m Ohm.inch$^2$/mil.

This finding is confirmed by Examples 20 and 21:

EXAMPLE 20

750 g of silica according to Example 3 are mixed in a mixer (vertical universal mixer EM 25 type from Mischtechnik Industrieanlagen GmbH, Detmold/FRG) with 288 g of Hostalen GUR X 106 (ultra-high molecular weight type of high density polyethylene from HOECHST AG, Frankfurt a.M.) with 45 g of a highly effective wetting agent and with 8.4 g of a phenolic resin at a speed of 120 rpm, and a quantity of 1,900 g of Mobil oil FBK 150 extra heavy is then added. After all the oil has been added, mixing is continued for another ½ minute. The product thereby obtained is a free-flowing and continuously meterable powder which is processed with the aid of a twin-screw extruder (ZSK 30 M 9/2 type from Werner & Pfleiderer, Stuttgart) with a heated flat-sheet die 220 mm wide (Gottfert Prüfmaschinen GmbH, Buchen) and a triple roll calender (Polyfol 150 3 S type from Ruth Schwabenthan, Berlin) to obtain a film about 0.25 mm thick. At a screw speed of 93 rpm, a temperature profile of 150° to 200° C. is chosen between the feed zone of the extruder and the die. The melt temperature measured between the extruder and the die is 191° C. The melt pressure in bar and the torque of the screws as a % of the maximum permissible torque are read off the twin-screw extruder as a measure of the processing behavior of the mixture during extrusion. The mineral oil is then extracted to a large extent from the film thus produced with hexane so that a microporous separator film is obtained.

The resistivity and the mechanical properties such as tensile strength and elongation at break of the films extracted to a residual oil content of 12–14% are measured according to the methods described above. The measured values determined from the films produced according to Example 20 are summarized in Table 7.

EXAMPLE 21

A separator mixture with a silica : polymer ratio of 3:1 is prepared, then extruded and characterized. The procedure adopted is substantially the same as that described in Example 20, but only 250 g of the polymer used in Example 20 are used (instead of 288 g).

Table 7 shows that the reduction in the resistivity during the change from a silica : polyethylene ratio of 2.6:1 to 3:1 is 7% with an extremely low value of 0.58 m Ohm.inch$^2$/mil, and the processing data develop in a more favourable manner as the SiO$_2$:PE ratio increases. The mechanical data fall somewhat, but remain within the absolutely safe range of the requirements to be met by battery manufacturers.

TABLE 7

Production conditions and properties of highly porous silica-polyethylene battery separators for car starter batteries on a lead-acid basis with a film thickness of 0.25 mm.
Variable: Silica-polymer ratio (SiO$_2$:PE)

| Example no. | | 20 | 21 |
|---|---|---|---|
| Precipitated silica | | Silica according to the invention (Example 3) | Silica according to the invention (Example 3) |
| SiO$_2$:PE ratio | | 2.6:1 | 3.0:1 |
| Melt temperature | °C. | 191 | 189 |
| Melt pressure | bar | 116 | 102 |
| Torque | % | 55 | 53 |
| Resistivity | | | |
| after 20 minutes' soak | mΩ · in$^2$/mil | 0.76 | 0.66 |
| after 24 hours' soak | mΩ · in$^2$/mil | 0.58 | 0.54 |
| Mechanical properties: | | | |
| Elongation | % | 999 | 940 |
| Tensile strength | N/mm$^2$ | 5.30 | 4.20 |

What is claimed is:

1. Precipitated silica with the physical-chemical characteristics:

| BET surface: | DIN 66131 | 100–130 m$^2$/g |
|---|---|---|
| DBP absorption (anhydrous) | DIN 53601 ASTM D 2414 | ≧275 g/100 g |
| Loss on drying (2 h/105° C.) | DIN ISO 787/II ASTM D 280 JIS K 5101/21 | 3.5–5.5 wt. % |
| Oversize with ALPINE air-jet sieve: | | |
| >63 μm | | ≦10.0 wt. % |
| >150 μm | | ≦0.1 wt. % |
| >250 μm | | ≦0.01 wt. % |

2. Precipitated silica according to claim 1 with a chloride content of ≦100 ppm Cl.

3. A process for the preparation of precipitated silica with the physical-chemical data:

| BET surface: | DIN 66131 | 100–130 m$^2$/g |
|---|---|---|
| DBP absorption (anhydrous) | DIN 53601 ASTM D 2414 | ≧275 g/100 g |
| Loss on drying (2 h/105° C.) | DIN ISO 787/II ASTM D 280 JIS K 5101/21 | 3.5–5.5 wt. % |
| Oversize with ALPINE air-jet sieve: | | |
| >63 μm | | ≦10.0 wt. % |
| >150 μm | | ≦0.1 wt. % |
| >250 μm | | ≦0.01 wt. % | comprising, a) introducing water at a temperature of 90°–91° C. into a precipitation vessel, b) adding, while stirring, commercial water glass with an SiO$_2$:Na$_2$O modulus of 3.34:1 (SiO$_2$=26.8 wt. %; Na$_2$O=8.0 wt. %) until a constant alkali value is reached, c) maintaining a constant temperature throughout the precipitation period of 90 minutes and simultaneously adding water glass and sulfuric acid at two separate places in the vessel such that a constant alkali value is maintained in the region of 5–15, d) acidifying the silica suspension with concentrated sulfuric acid until a pH-value of 8.5 is obtained, e) interrupting the precipitation reaction for 30 minutes with stirring, f) continuing with the acidification at 90°–91° C. with concentrated sulfuric acid until a pH-value of 4 is reached, g) separating the precipitated silica from the suspension having a solids content of approx. 88 g/l to obtain a filter cake by a chamber filter press, h) washing the filter cake obtained, i) liquefying the filter cake by means of water and mechanical shear forces, and j) drying the silica with the aid of a spray drier with a centrifugal atomizer or a spin flash drier.

4. A process according to claim 3, wherein the alkali value of step c) is 7.

5. A process according to claim 3, further comprising, k) grinding the dried silica with a roller mill or crossflow mill.

6. A process according to claim 5 wherein grinding is with a crossflow mill.

7. A process according to claim 3 or 5, wherein the spray drying operations are carried out with a solid content of the silica feed being 16–20%, a centrifugal atomizer speed of 10,000–12,000 rpm and inlet temperatures of the hot gases of 700°–750° C. and outlet temperatures of 90°–120° C.

8. A process according to claim 7, wherein the solids of the silica feed is 18%.

9. A process according to claim 3, wherein the filter cake obtained by means of the filter press is washed with low-chloride water ≦100 ppm chloride.

10. A process according to claim 9, wherein the low-chloride water (≦20 ppm chloride) is deionized water or condensate.

11. A process according to claim 3 or claim 5, wherein a spin flash drier is used in step j).

* * * * *